(12) United States Patent
Seo

(10) Patent No.: US 8,769,527 B2
(45) Date of Patent: Jul. 1, 2014

(54) SERVER CONNECTED WITH IMAGE FORMING APPARATUS AND CLIENT, IMAGE FORMING SYSTEM HAVING THE SAME, AND DRIVER REMOTE INSTALLATION METHOD OF IMAGE FORMING APPARATUS

(75) Inventor: Jung-soo Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 893 days.

(21) Appl. No.: 12/546,040

(22) Filed: Aug. 24, 2009

(65) Prior Publication Data

US 2010/0107157 A1 Apr. 29, 2010

(30) Foreign Application Priority Data

Oct. 24, 2008 (KR) .................. 10-2008-0105005

(51) Int. Cl.
*G06F 9/445* (2006.01)
(52) U.S. Cl.
USPC ............................................. 717/178
(58) Field of Classification Search
None
See application file for complete search history.

(56) References Cited

U.S. PATENT DOCUMENTS

| 6,681,392 B1 | 1/2004 | Henry et al. | |
| 7,552,432 B2 * | 6/2009 | Aiba ........................... | 717/177 |
| 8,443,060 B2 | 5/2013 | Kemp et al. | |
| 2001/0056572 A1 | 12/2001 | Richard et al. | |
| 2003/0131149 A1 * | 7/2003 | Sugiura ........................ | 709/321 |
| 2004/0010795 A1 * | 1/2004 | Sasaki et al. .................. | 719/321 |
| 2005/0132090 A1 * | 6/2005 | Kim et al. ....................... | 710/1 |
| 2008/0134171 A1 * | 6/2008 | Matsunami et al. .......... | 717/177 |

FOREIGN PATENT DOCUMENTS

| JP | 2006-172093 | 6/2006 |
| KR | 10-2004-0020148 | 3/2004 |
| KR | 10-2006-0033125 | 4/2006 |
| KR | 10-0778160 | 11/2007 |

OTHER PUBLICATIONS

Office Action issued in Korean Application No. 10-2008-0105005 on Jun. 19, 2013.
Notice of Allowance issued in Korean Application No. 10-2008-0105005 on Dec. 30, 2013.

* cited by examiner

*Primary Examiner* — Henry Tsai
*Assistant Examiner* — Juanito Borromeo
(74) *Attorney, Agent, or Firm* — Stanzione & Kim, LLP

(57) ABSTRACT

A server connected with an image forming apparatus and a client, an image forming system having the same and a driver remote installation method of an image forming apparatus, the method including selecting at least one client in which a driver of the image forming apparatus is to be installed by the server; selecting a type of the driver to be installed in the at least one selected client; installing an install manager to install the driver in the at least one selected client; and installing the selected driver in the at least one selected client using the install manager.

23 Claims, 15 Drawing Sheets

FIG. 3A

Samsung SCX_0000 MFP

1. Welcome
2. Group Configuration
   Select Client Groups
3. Finding Printers
4. Installation
5. Summary

Select Client Groups

To install the printer on remote clients or servers, please select client groups in the below list.
You can see the group details and S/W components installed previously in that group on the right side.

If you have not configured any group before, you don't see any item in the list.
You may create client groups by clicking 'New Group' button.

Group Name
☐ Printer Group
☑ SW Group
☐ Design Group
☑ Group4
☐ Group5

Group Descriptions

Name : Design Group
Domain : Sdesign
Printer : 165.213.17.154

Components previously installed

Printer Driver
Network Scan Driver
Smart Panel
SmarThru Office

New Group — 31
Edit Group — 32
Load Group — 33
Delete Group — 34

< Back    Next >    Cancel

FIG. 3B

Samsung SCX_0000 MFP

Log-in to Client Domain
Please enter administrator's ID & Password for accessing network,

- 1.Welcome
- 2.Finding Clients
- Administrator ID/PW
- 3.Finding Printers
- 4.Installation
- 5.Finish Domain : ⎯ 35
i.e., Sdesign/PRT
ID : ⎯ 36
P/W : ⎯ 37

Log-in

< Back
Next >
Cancel

FIG. 3C

⊙ Samsung SCX_0000 MFP

Select Client Groups

Please type group name, then click the 'Create' button. You can see the new tab with the name on the right list. For selecting clients you want to remotely install, Please move clients in the left side to the right side list.

▷ 1.Welcome
▽ 2.Group Configuration
  ✓ New Group
  ✓ Log-in to Client Domain
  ⇎ Select Clients
▷ 3.Finding Printers
▷ 4.Installation
▷ 5.Summary Group Name: [New Group]

☐ Clients in Sdesign
☑ AV_kim
☑ AV_lee
☐ Cad_kang
☐ Com_hee
☑ Com_jung
☑ Design_aa
☐ Design_bb
☑ Design_cc

[Add others]

☐ Clients in New Group
☑ AV_kim
☑ AV_lee
☑ Cad_kang

38 ⎯ [Save Group]

[< Back]  [Next >]  [Cancel]

FIG. 3D

Samsung SCX_0000 MFP

1. Welcome
2. Group Configuration
3. Finding Printers
4. Installation
- Select S/W and utilities
5. Summary Select Software and Utility to install Please select the software, utilities, or other components you want to install by each group.

Specify by: SS Group

| Component Name | Size |
|---|---|
| ☑ SCX_0000 Printer Driver | 0000 bytes |
| ☐ SmarThru Office 2.0 | 0000 bytes |
| ☐ SmarThru Work Flow 2.0 | 0000 bytes |
| ☑ Photo Thru 1.0 | 0000 bytes |
| ☐ SmartPanel | |

Space Required:0000 bytes

Install PhotoThru 1.0 - Require 50.4 MB
This will install PhotoThru 1.0 and some documentation.

< Back    Next >    Cancel

FIG. 5A

[Group Info]
GroupName = S/W 1G

Domain = 38FA291934FC2A202807351535
Administrator = 34625567515F5D6A5670626A53
Password = 7D5A44835853396D

[Clients]
AV_kim = 10.88.193.XXX
Cad_kang = 10.88.197.XXX
Com hee = 10.88.195.XXX

FIG. 5B

```
Struct _RM_CLIENT
{
LPCTSTR lpClientName;
LPCTSTR lpIp;
_RM_STATUS* pStatus[];
};

Struct _RM_STATUS//Saved by SSSVRTCPDLL
{
LPCTSTR lpComponent;
LPCTSTR lpStatus;
};
```

FIG. 5C

- Server Command
EXECUTE: Command to execute [Setup.exe]
GETLOG: Command to copy log file to Share Folder of Server (File Name<Client PC's IF address>_Log.log
END: Command to disconnect with Server

- Fail Command of environment:
[STATUS:Fail, CLIENT_ENVIR:, MSG:Message]
Ex) [STATUS:Fail, CLIENT_ENVIR:, MSG:shortages of storage]

- Installation Status
Installing: [STATUS:Installing, COMPONENT:Component Name, INDEX:index of component, TOTAL:total number of components]
Success: [STATUS:Complete, COMPONENT:Component Name, INDEX:index of component, TOTAL:total number of components]
Fail: [STATUS:Fail, Component:component Name, INDEX:index of component, TOTAL:total number of components]
1.2.1.1.1.1.1.1. EX)[STATUS:Installing, COMPONENT:SmarThru, INDEX:2, TOTAL:5]

FIG. 6A

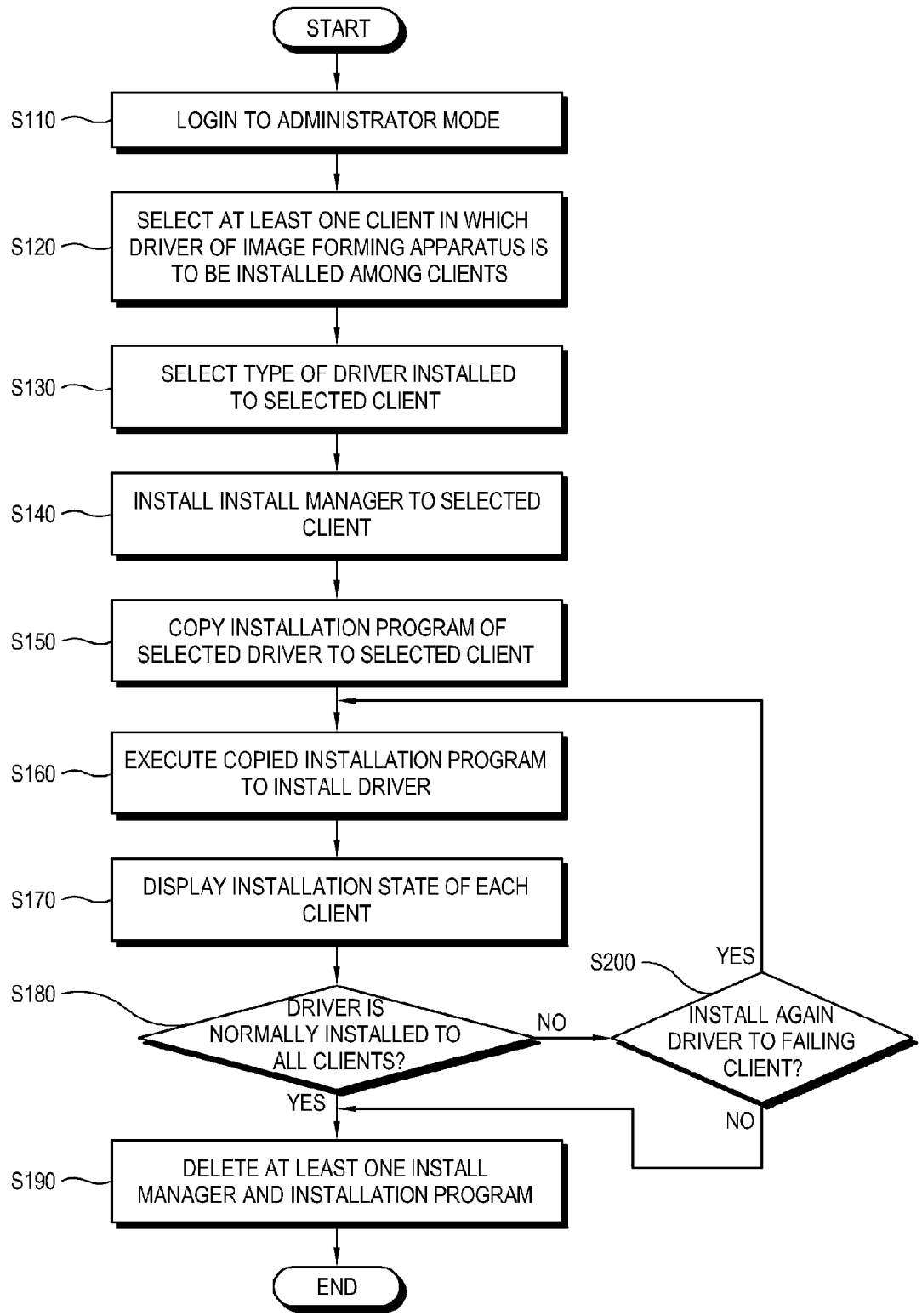

SERVER CONNECTED WITH IMAGE FORMING APPARATUS AND CLIENT, IMAGE FORMING SYSTEM HAVING THE SAME, AND DRIVER REMOTE INSTALLATION METHOD OF IMAGE FORMING APPARATUS

CROSS-REFERENCE TO RELATED APPLICATIONS

This application claims the benefit under 35 U.S.C. §119 of Korean Patent Application No. 10-2008-0105005, filed on Oct. 24, 2008, in the Korean Intellectual Property Office, the disclosure of which is incorporated herein by reference in its entirety.

BACKGROUND

1. Field of the Invention

The present general inventive concept relates to a server connected with an image forming apparatus and a client, an image forming system having the same and a driver remote installation method of an image forming apparatus, and more particularly, to a server connected with an image forming apparatus and a client, an image forming system having the same and a driver remote installation method of an image forming apparatus remotely installing a driver by each user group.

2. Description of the Related Art

An image forming apparatus forms an image to be printed on a paper. The image forming apparatus may be implemented as a printer, a photocopier, a facsimile machine, a multifunction device having two or more such, or the like.

Recently, the image forming apparatus has been widely used in office automation as a multifunction apparatus performing a scanning function, a facsimile function, etc., in addition to a printing function, outputting a document, etc. Accordingly, the image forming apparatus has been developed to have a high performance and expand upon an available inherent function to perform various functions, and an available function of the image forming apparatus may be restricted depending on a determined authority of a user.

Accordingly, to more efficiently administer an image forming system including at least one client personal computer (host apparatus) connected with an image forming apparatus on a network depending on the authority of a user, a driver of the image forming apparatus installed by each client is differently determined and administered through a system administrator.

In detail, the system administrator, that is, a server personal computer (PC), is remotely connected to each client to perform a remote installation such as distribution, installation and deletion of software such as a driver.

However, as the functions of the image forming apparatus increase in variety and the speed and capacity of the network become developed, the load of the system administrator administering clients further increases, and the functions which the system administrator administers per each client increases.

In general, regarding a driver of an image forming apparatus, it is normal to determine the driver using the authority of specific users.

However, in the image forming system according to the conventional remote installation, to install a driver to the client having the same using authority, the server is separately connected to each client to determine the type of a driver to be installed, and repeatedly performs the same installing work to each client.

Accordingly, the conventional installing process results in a large and unnecessary amount of time and cost, as well as inconvenience for an administrator repeatedly performing the same work.

SUMMARY

Example embodiments of the present general inventive concept provide a server connected with an image forming apparatus and a client, an image forming system having the same and a driver remote installation method of an image forming apparatus selecting at least one client of clients in which a driver is to be installed, concurrently performing a driver installation in each selected client to save unnecessary time and cost, and providing convenience to a system administrator.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a driver remote installation method of an image forming apparatus which is connected with a server and at least one of a plurality of clients, the method including selecting the at least one client in which a driver of the image forming apparatus is to be installed by the server; selecting a type of the driver to be installed on the selected at least one client; installing an install manager to install the driver in the selected client; and installing the selected driver in the selected client using the install manager.

The installing the driver may include displaying an installation state of the driver of each selected client of the plurality of clients.

The selecting the at least one client may include determining a group that includes the selected at least one client.

The determining the group may include generating the group, adding the group, loading the group, editing the group, deleting the group, or a combination thereof.

The method may include storing information about the determined group.

The determining the group may include using group information previously stored.

The installing the driver may include copying an installation program of the selected driver in the selected at least one client.

The installing the driver may be performed in a background of the client.

The method may include displaying success or failure of the installation of the driver of each selected client in the server.

The method may include selecting to install the driver again with respect to a client in which the driver fails to be installed among the selected clients.

The method may include deleting the install manager, the installation program, or both with respect to a client in which the driver is installed among the selected clients.

The server may include one of the plurality of clients.

The foregoing and/or other features and utilities of the present general inventive concept may be achieved by providing a server which is connected with an image forming apparatus and at least one of a plurality of clients, the server including a communicating unit to communicate with the image forming apparatus and the at least one client; a user interface to select the at least one client in which a driver of the image forming apparatus is to be installed among the clients, and a type of the driver to be installed in the at least one client; and a control unit to install an install manager to install the driver in the at least one client, and to control the communicating unit to transmit a command to install the selected driver in the at least one client using the install manager corresponding to the selection of the client.

The server may include a display unit, and the control unit may control the communicating unit to receive installation information of the driver from the selected at least one client, and may control the display unit to display an installation state of the driver of any selected clients corresponding to the received installation information.

The user interface may determine a group which may include the selected at least one client.

The determining of the group may include generating the group, adding to the group, loading the group, editing the group, deleting the group, or a combination thereof.

The server may include a storing unit to store information about the determined group.

The control unit may determine the group using group information previously stored in the storing unit.

The control unit may transmit an installation program of the selected driver to the selected at least one client.

The communicating unit may receive information indicating success or failure of the installation of the driver from the selected client, and the display unit may display the success or failure of the installation of the driver of each selected client according to the received information.

The user interface may select installation of the driver again with respect to a client in which the driver fails to be installed among the selected clients.

The communicating unit may transmit a command to delete the install manager, the installation program, or both with respect to a client in which the driver is installed among the selected clients.

The foregoing and/or other features and utilities of the present general inventive concept may also be achieved by providing an image forming system which includes an image forming apparatus, a server and at least one of a plurality of clients, the server including: a first communicating unit to communicate with the image forming apparatus and the at least one client; a user interface to select the at least one client in which a driver of the image forming apparatus is to be installed among the clients, and a type of the driver to be installed in the at least one client; and a first control unit to install an install manager to install the driver in the at least one client, and to control the first communicating unit to transmit a command to install the selected driver in the at least one client using the install manager according to the selection of the client through the user interface, wherein the client includes a second communicating unit to communicate with the image forming apparatus and the server; and a second control unit to install the install manager and the selected driver in the at least one client upon receiving the command to install the install manager and the selected driver from the server through the second communicating unit.

The foregoing and/or other features and utilities of the present general inventive concept may also be achieved by providing a remote driver installation method including selecting at least one of a plurality of clients by a server, selecting a type of driver to be installed in the at least one client by the server, transmitting an installation manager to the at least one client from the server, and installing the driver in the at least one client using the installation manager.

The driver may drive an image forming apparatus connected to the server and the at least one client.

Any of the plurality of clients may operate as the server.

One of the plurality of clients may operate as the server in response to receiving verifiable administrative access information.

A plurality of clients may be selected to have the driver installed, and the driver may be installed in all of the selected clients concurrently.

The foregoing and/or other features and utilities of the present general inventive concept may also be achieved by providing a method of remotely installing a driver of an image forming apparatus in a plurality of clients by a server, the method including selecting a group of clients to receive the driver, and transmitting the driver from the server to the group of clients such that the driver is concurrently installed in the group of clients.

The method may further include transmitting an install manager from the server to the group of clients to install the driver.

The method may further include presenting a user interface at the server to be used by a user to select the group of claims and the driver.

The selection of the group by the user may include generation of a new group, loading a stored group, editing the stored group, adding to the stored group, deleting the stored group, or a combination thereof.

The method may further comprise presenting a progress report at the server which indicates a status of driver installation in each client in the group of clients.

The foregoing and/or other features and utilities of the present general inventive concept may also be achieved by providing a method of remotely installing a driver from a server to a plurality of clients, the method including selecting one of the clients to operate as the server, and transmitting the driver from the server concurrently to a group of clients to be installed in the clients receiving the driver.

The method may include selecting, at the server, one or more of the plurality of clients to be included in the group.

The foregoing and/or other features and utilities of the present general inventive concept may also be achieved by providing a recording medium having recorded thereon a program to cause a computer to perform a driver remote installation method of an image forming apparatus which is connected with a server and at least one of a plurality of clients, the method including selecting the at least one client in which a driver of the image forming apparatus is to be installed by the server; selecting a type of the driver to be installed on the selected at least one client; installing an install manager to install the driver in the selected client; and installing the selected driver in the selected client using the install manager.

BRIEF DESCRIPTION OF THE DRAWINGS

These and/or other features and advantages of the present general inventive concept will become apparent and more readily appreciated from the following description of the exemplary embodiments, taken in conjunction with the accompanying drawings of which:

FIGS. 3A to 3F illustrate examples of a group determining screen according to an exemplary embodiment of the present general inventive concept;

FIGS. 5A to 5C illustrate a determining data file and a communication file generated according to an exemplary embodiment of the present general inventive concept;

FIGS. 6A and 6B illustrate examples of a display screen of a driver installation state of each client according to an exemplary embodiment of the present general inventive concept; and FIG. 7 is a flowchart illustrating a driver remote installation method according to an exemplary embodiment of the present general inventive concept.

DETAILED DESCRIPTION OF THE EMBODIMENTS

Figure 1:
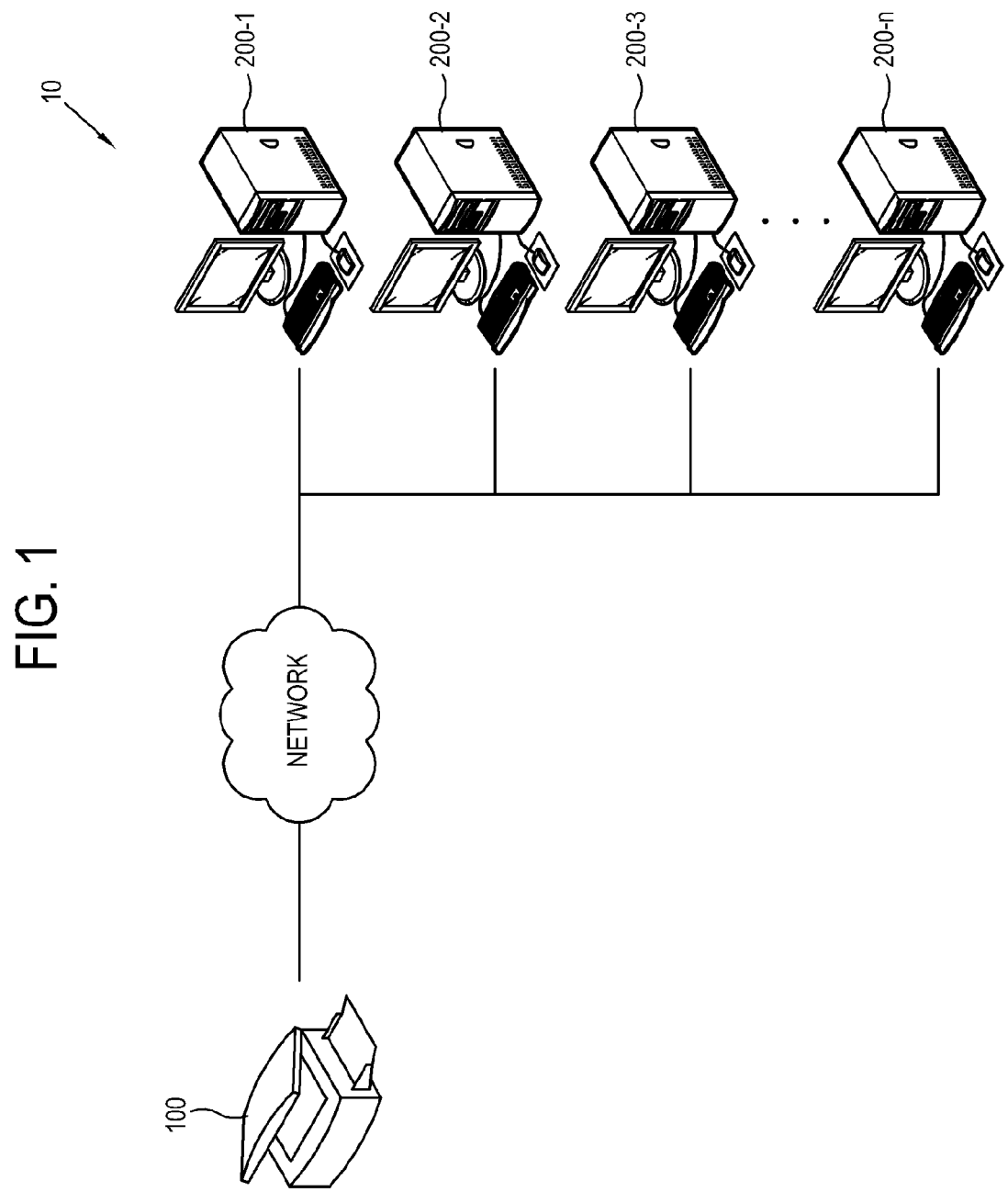
FIG. 1 is a schematic view illustrating the configuration of an image forming system according to an exemplary embodiment of the present general inventive concept.

Reference will now be made in detail to various exemplary embodiments of the present general inventive concept, examples of which are illustrated in the accompanying drawings, wherein like reference numerals refer to like elements throughout. The exemplary embodiments are described below so as to explain the present general inventive concept by referring to the figures. Repetitive description with respect to like elements of different embodiments may be omitted for the convenience of clarity.

FIG. 1 is a schematic view illustrating the configuration of an image forming system 10 according to an exemplary embodiment of the present general inventive concept.

As illustrated in FIG. 1, the image forming system 10 according to the present exemplary embodiment may include an image forming apparatus 100, and at least one client 200-1, 200-2, 200-3, . . . , 200-n.

The image forming apparatus 100 may include an image forming unit (not shown), and may be implemented as a printer, a multifunction device performing more than two functions, etc., connectable to a network. Each of the at least one client 200-1, 200-2, 200-3, . . . , 200-n may be implemented as a host apparatus such as a personal computer (PC), etc.

If a plurality of clients are provided, a user may perform a login at each of the plurality of clients 200-1, 200-2, 200-3, . . . , 200-n to use the image forming apparatus 100.

In one of the plurality of clients 200-1, 200-2, 200-3, . . . , 200-n, the user may perform a login of an administrator mode in which determining and changing with respect to all environments of the image forming apparatus 100 are available without a separate access restriction.

Here, the client in which the login of the administrator mode is performed may be remotely connected to other clients, and may perform an installation of software such as a driver of the image forming apparatus 100 to the connected clients. Accordingly, the client in which the login of the administrator mode is performed becomes able to perform a role of a server 200, which is illustrated in FIG. 2 and will be discussed in more detail later in this description.

The server 200 according to the present exemplary embodiment may select at least one client of the plurality of clients 200-1, 200-2, 200-3, . . . , 200-n in which a predetermined driver is to be installed, and may concurrently perform the installation of the driver with respect to the at least one selected client. In the present exemplary embodiment, the login of the administrator mode may be available in all clients of the plurality clients 200-1, 200-2, 200-3, . . . , 200-n, and the client in which the login of the administrator mode is performed becomes the server 200. Also, in the present exemplary embodiment, the same type of a driver may be concurrently installed on a plurality of clients selected at once.

Figure 2:
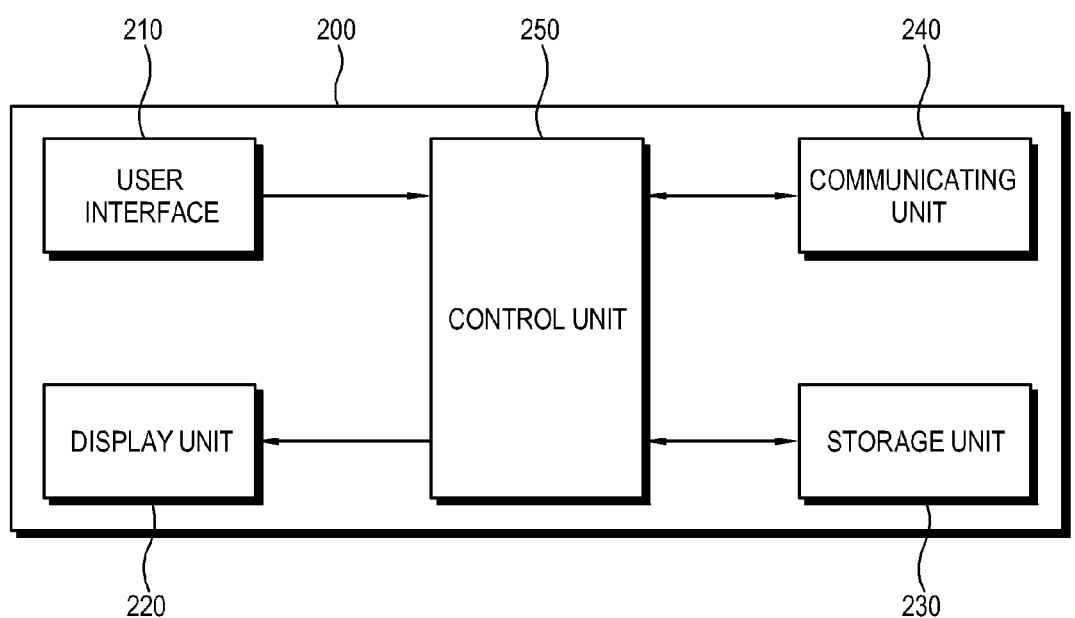
FIG. 2 is a block diagram illustrating the configuration of a server according to an exemplary embodiment of the present general inventive concept.

FIG. 2 is a block diagram illustrating the configuration of the server 200 according to an exemplary embodiment of the present general inventive concept.

As shown in FIG. 2, the server 200 may include a user interface 210, a display unit 220, a storage unit 230, a communicating unit 240 and a control unit 250.

The user interface 210 may receive a user command to select at least one of a plurality of clients 200-1, 200-2, 200-3, . . . , 200-n in which the installation of a driver is desired, and may determine the type of the driver installed on the at least one selected client. More particularly, a user may determine a group including at least one of the plurality of clients 200-1, 200-2, 200-3, . . . , 200n in which the user wants to install a driver of the image forming apparatus 100, and may select the type of the driver to be installed with respect to the determined group in the display unit 220 through the user interface 210. In this embodiment, the group determining may include at least one of generating, adding, loading, editing and deleting of a group.

The user interface 210 may receive an administrator ID and code (or password, etc.) as a login to an administrator mode from the user. The control unit 150 may confirm the user as a system administrator through the input administrator ID and code (or password, etc.).

The user interface 210 may include a keyboard, a mouse, etc., provided as an input device of the server 200, and may include a graphic user interface (GUI) (hereinafter, also referred to as a "local user interface (LUI)") generated by execution of a driver or a separate application to be displayed in the display unit 220 to receive a user input. If the user interface 210 includes a GUI, the server 200 may display a GUI in which at least one of the plurality of clients 200-1, 200-2, 200-3, . . . , 200-n is selectable, and may receive a command to determine a group including at least one client selected by using the displayed GUI.

The display unit 220 may display a determining screen used to determine a group including at least one client of the plurality of clients 200-1, 200-2, 200-3, . . . , 200-n, and an installation state of a driver of each client. More particularly, the display unit 220 may display a determining screen configured such that the plurality of clients 200-1, 200-2, 200-3, . . . , 200-n included in the image forming system 10 can be selected, and may display an installation state of a driver of each client included in the determined group to a user.

The user may select the type of a driver which the user wants to install in a corresponding group through the user interface 210 according to a user group determining screen including at least one client displayed in the display unit 220. The server 200 may transmit an installation program corresponding to the type of the driver to each client included to the corresponding group.

In the present exemplary embodiment, different types of drivers may be installed in each group. For example, if a user authority of the image forming apparatus 100 is different with respect to a group A and a group B, all drivers with respect to printing, scanning and facsimile may be installed to the group A, and only a driver with respect to printing may be installed to the group B. Accordingly, use of the image forming apparatus 100 by each group and by each user can be respectively restricted.

The display unit 220 may include, for example, a thin film transistor liquid crystal display (TFT-LCD), and a driving unit (not shown) driving the TFT-LCD.

FIGS. 3A to 3F illustrate examples of a group determining screen according to an exemplary embodiment of the present general inventive concept.

As shown in FIG. 3A, the display unit 220 may display a determining screen in which a group to be determined is selectable to a user. More particularly, if the user selects a group determining menu, the control unit 150 may display information about a group previously determined to the user. The displayed information about the group may include a group name, a domain, information (e.g., IP) of the image forming apparatus which the corresponding group is allowed to use, a driver information, etc.

In the determining screen illustrated in FIG. 3A, the user may generate, add, edit or delete a new group. Also, the user may use information of a group previously stored in the storage unit 230 to determine a group. With respect to a predetermined group, the previously stored group information may include a client included in the group, driver installation information of each client, etc. According to the present exemplary embodiment, the server 200 may load group information stored in other client apparatuses, etc., as well as the storage unit 230, and may display such information in the display unit 220.

As illustrated in FIG. 3A, the displayed group determining screen may include UI buttons 31, 32, 33 and 34 respectively corresponding to generating (e.g., adding), editing (e.g., correcting), loading and deleting of a group.

The display unit 220 may display a login mode screen of an administrator mode to connect to the user group selected in FIG. 3A. More particularly, a login screen as illustrated in FIG. 3B may include input fields 35, 36 and 37 to receive a group domain, an administrator ID and an administrator code (or password, etc.). The user may input the domain, administrator ID and administrator code in the login screen displayed in FIG. 3B through the user interface 210, and the server 200 may perform certification according to the input administrator ID and administrator code (or password, etc.).

If a user selects the new group UI button 31 in FIG. 3A to generate a new group, the display unit 220 may display a computer name of at least one client included in a stored group as illustrated in FIG. 3C to be selectable, and the user may select one or more clients in the stored group to be included in the newly generated group by using the user interface 210.

If the selection of the one or more clients is completed, the user may store the generated group information by using the UI button 38 corresponding to the storing of the group information in FIG. 3C.

Also, as illustrated in FIG. 3D, the display unit 220 may display a screen to determine the type of a driver to be installed with respect to the determined group. The driver according to the present general inventive concept may include various applications, software (S/W), solutions, etc., used in a function expansion of the image forming apparatus 100, in addition to a printer driver to be used with the image forming apparatus 100, depending on the type of the image forming apparatus 100. For example, as illustrated in FIG. 3D, a driver to be used with the application "Photo Thru 1.0" may be installed to the selected group of clients along with a "SCX_000 Printer Driver".

Figure 3E:
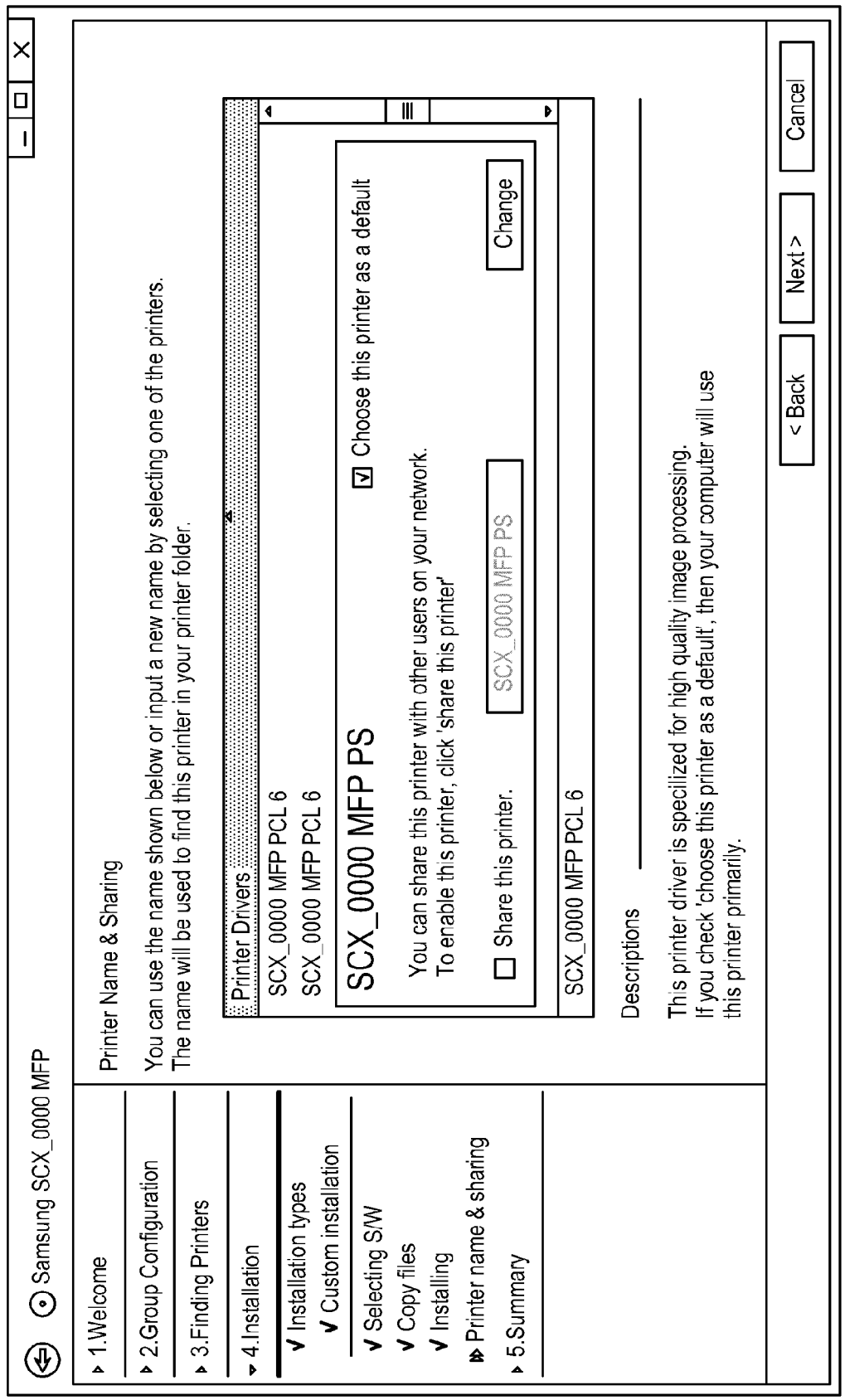
Figure 3F:

Also, as illustrated in FIG. 3E, the display unit 220 may display a screen to determine an installation option of one or more of the drivers determined in FIG. 3D, and may uniformly display the determined group information as illustrated in FIG. 3F to the user so that the user can easily confirm the selections.

As illustrated in FIGS. 3A to 3F, in the present exemplary embodiment, the determining of the user group including at least one client is exemplarily described. Alternatively, at least one client in which a driver is to be installed may be selected by a user to perform a remote installation without determining a group, if the user so desires.

The group information determined in FIGS. 3A to 3F may be stored in the storage unit 230. The storage unit 230 may be implemented as an internal storage module such as a hard disk drive, a flash memory, etc., or an external storage module. Certification information used to certify an administrator mode may be further stored in the storage unit 230 of the server 100 according to the present exemplary embodiment.

The communicating unit 240 may perform communication with at least one client included in a corresponding group by referring to determined group information.

In detail, the server 200 may perform a data communication with each client through the communicating unit 240, transmit a command to install a driver on a client selected to be included in the corresponding group, and continually receive and transmit state information about the driver installation from and to each client.

Figure 4:
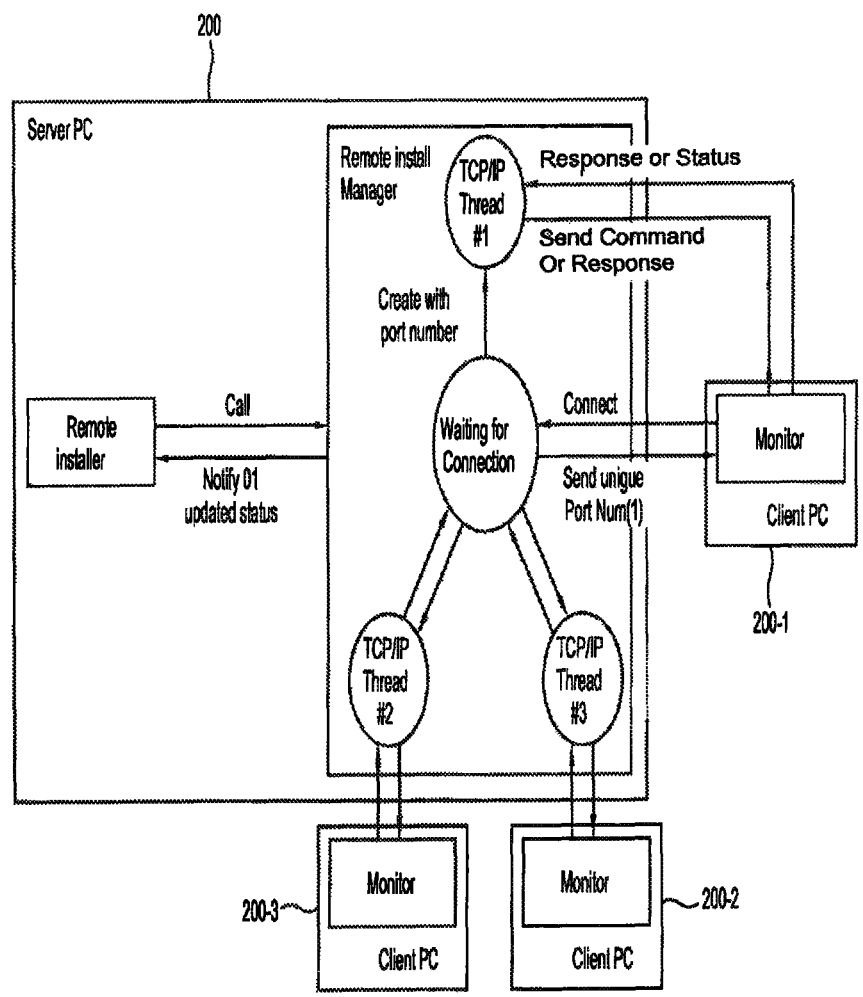
FIG. 4 illustrates a data communicating process between a server and a client according to an exemplary embodiment of the present general inventive concept.

As illustrated in FIG. 4, an install manager may be installed in the server 200 and each client as a monitoring program of a driver remote installation and a data communication. Accordingly, the server 200 may perform a data communication with at least one client by a predetermined protocol, and may remotely perform a driver installation by using the install manager. The install manager may operate as an agent to efficiently perform a connection between the server 200 and each client, and communication of data such as various commands, state information, an installation program, etc. The install manager installed to the server 200 may become a remote install manager.

The communicating unit 240 may be implemented as wired or wireless communication modules connectable with an external device such as the image forming apparatus 100 and a client through a local or network connection by a predetermined protocol.

The control unit 250 may control the server 200. More particularly, the control unit 250 may control the display unit 220 to display a group determining screen, that is, a determining screen to select at least one client to which a driver of the image forming apparatus 100 is installed, select at least one client included in a group by using the user interface 210 depending on the displayed determining screen, select the type of a driver installed to the group including the selected client, and remotely install the selected driver to at least one selected client, that is, the client included in the group.

In such an operation as this, the server 200 may include an install manager, that is, a monitoring module to receive and transmit a command or state information from and to each client included in the group, and to perform a driver remote installation. The monitoring module may be implemented as being added as a separate configuration element, or being included in the control unit 250.

FIGS. 5A to 5C illustrate a determining data file and a communication file generated according to the exemplary embodiment of the present general inventive concept.

A group determining information file according to the present exemplary embodiment includes GroupName.rgi, which is a group information file, and GroupName.xml, which is a group installation determining file. GroupName.rgi and GroupName.xml may be generated in determining a group, and as illustrated in FIG. 5A, GroupName.rgi may include domain information, a group name, an administrator ID and an administrator code of a determined group, and information about a client included in the group.

GroupName.xml may include an installation option commonly applied to the determined group, that is, information about a basic printer, a printer port, sharing, a driver determining, etc., and this file may be transmitted to each client with an installation command to be used in a remote installation of a driver.

If the installation command of the driver is transmitted to each client, the server 200 may transmit and receive information about an installation state to and from each client. FIG. 5B illustrates a data structure which may be used to transmit an information communication of an installation state, and as illustrated in FIG. 5B, the state information may include a client name, a client IP address, name of a driver (S/W) to be installed, an installation state information, etc.

FIG. 5C illustrates a command which may be transmitted and received between the server 200 and each client, and as illustrated in FIG. 5C, the server 200 may transmit a corresponding command to a monitoring module of a client side to execute a command such as a remote installation, an installation result report log file request, an installation end, etc. A remote install manager of a server 200 side and a remote install manager of a client side may transmit and receive a command and state information through a network.

To remotely install a selected driver to at least one selected client, the control unit 250 may share a folder in which an installation program of the corresponding driver is stored, and copies the installation program of the shared folder to each client. Then, the control unit 250 may execute the copied installation program to remotely install the driver. In such a situation, the remote installation of the driver may be concurrently performed with respect to each client.

More particularly, if receiving an execute command, the control unit 250, as illustrated in FIG. 5C, may execute an installation program copied to each client through a local path like [Setup.exe/I"<Path>\<configuration_filename>"/S/F"<Path>\<log_filename>"/T] to perform a remote installation with respect to a driver. Here, configuration_filename indicates a GroupName.xml file, and log_filename is an example of the case of manually designating an installation report log file.

The control unit 250 may receive the installation state information from each client included in the group, and may control the display unit 220 to display according to each client.

Figure 6A:
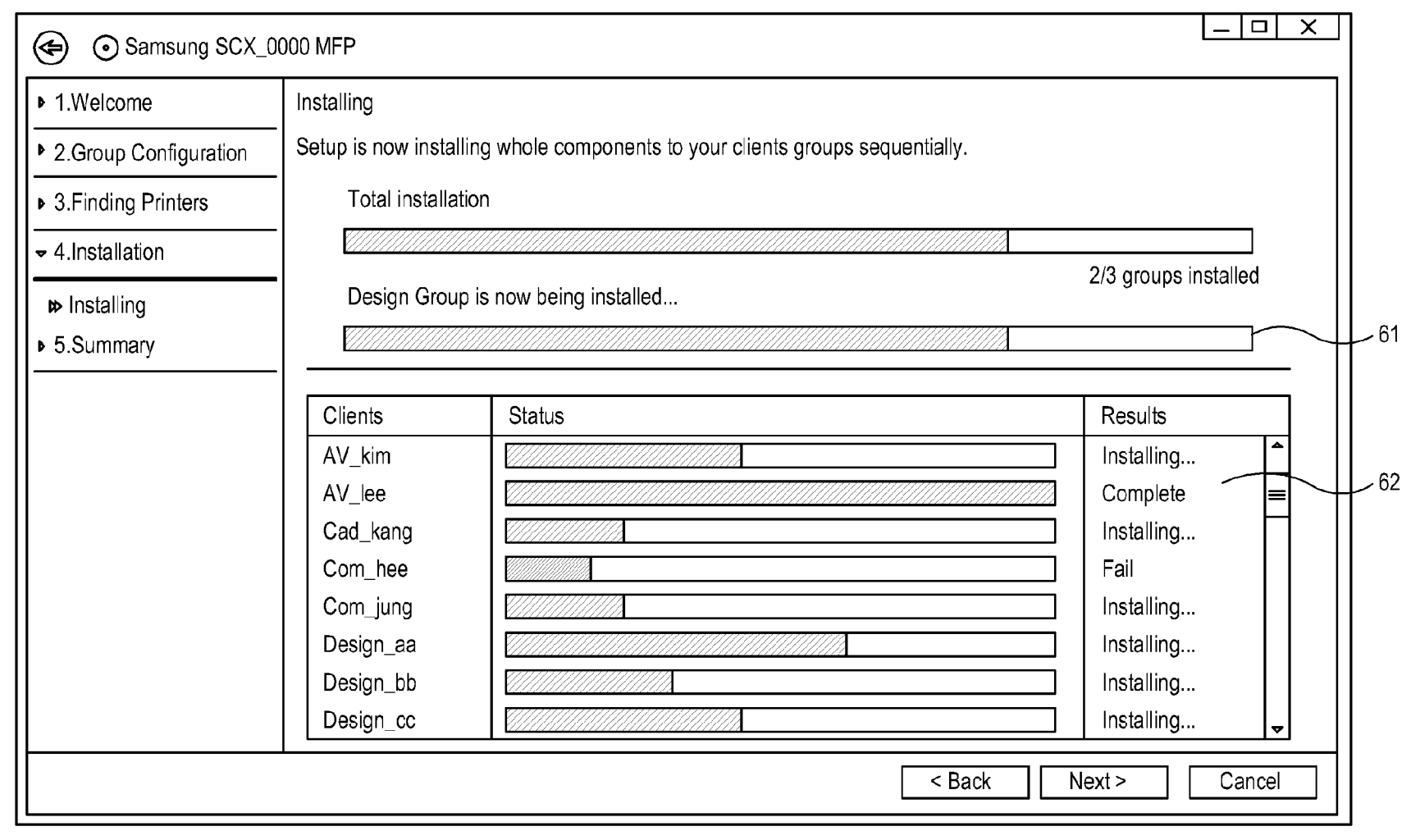
Figure 6B:

FIGS. 6A and 6B illustrate a display screen of an installation state of each client.

As illustrated in FIG. 6A, a display screen may include a graph 61 representing an installation degree of a driver with respect to the total number of clients, and a graph 62 representing an installation degree of each individual each client included in a group. Accordingly, a user can easily confirm the installation state of the total clients and of each client through the display unit 220.

If a driver installation job is completed, as illustrated in FIG. 6B, the control unit 250 may control the display unit 220 to display a result screen representing indicators of success or failure of the installation of each client. Referring to FIG. 6B, the displayed result screen may include a display window 63 representing the number of an installed or successful client in each determined group, a list 64 displaying a client failing to be installed among clients included in a selected group, and a window 65 representing a failure list of a selected client.

A user may select through the user interface 210 whether to install again with respect to a client in which the driver fails to be installed depending on the display result of the display unit 220. Also, the user may output an installation result report according to the result screen in FIG. 6B.

If the user selects to perform installing again with respect to a specific client failing to be installed, the control unit 250 performs again a remote installing of a driver with respect to the corresponding client. Also, at least one of the installation program and the install manager copied to the client in which the installation is completed may be deleted.

Also, the copying and installing operations of the installation program as described above may be performed in a background (that is, a silent mode) so that a user using the corresponding client will not be aware of the operations occurring in the corresponding client.

In the image forming system 10 illustrated in FIG. 1, each client may receive various commands to perform a remote installation of a driver from the server 200, and may perform the installation of a determined driver depending on management of the server 200. In these operations, an install manager may be installed to each client as a monitoring program (or an agent program), and the install manager may periodically transmit a state (an environment information), installation state information, etc., of the client to the server 200.

Hereinafter, a driver remote installing process according to the image forming system 10 as described above will be described by referring to FIG. 7.

Referring to FIG. 7, a user may perform a login to an administrator mode in at least one client 200-1, 200-2, 200-3, . . . , 200-n (S110). Certification with respect to an administrator ID and an administrator code of the login may be performed, and the client certifying the administrator may become the server 200.

The server 200 may select at least one client in which a driver of the image forming apparatus 100 is to be installed among the clients 200-1, 200-2, 200-3, . . . , 200-n (S120). The operation S120 may include determining a group including at least one selected client. The group determining may include, for example, at least one of generating, adding, loading, editing, deleting and storing of a group. The determined group information may be stored in the storage unit 230. In determining a group, a user may use group information previously stored, and the group information previously stored may include a client included in a predetermined group, driver installation information of each client, etc.

The server 200 may select the type of a driver installed in the client selected in the operation S120 (S130).

A monitoring program, e.g., an install manager, may be installed in the server 300 and the selected client (S140). The installation of the operation S140 may include executing a program previously installed, or updating to execute.

Then, the server 200 may copy an installation program corresponding to the type of the driver selected in the operation S130 to the client selected in the operation S120 (S150). The copying process of the operation S150 may include sharing a folder in which the corresponding installation program is stored. The shared folder may be provided to one of a plurality of clients 200-1, 200-2, 200-3, . . . , 200-n as well as the server 200.

The server 200 may execute the installation program copied in the operation S150 to install the driver (S160).

The server 200 may display to the user an installation state of each client in which the installation program is executed in the operation S160 through the display unit 220 (S170). The displaying in the operation S170 may include displaying success or failure of the driver installation in each client.

In an installation result of the operation S160, the server 200 may determine whether the driver is normally installed to each client (S180).

In the determining of the result in the operation S180, if the driver is normally installed to all clients selected in the operation S120, the server 200 may delete at least one of the installation program and the install manager copied to each client S190, and may end all remote installation operations.

In the determining of the result in the operation S180, if the driver is not normally installed to one or more of the clients, the user may select whether to install again the driver to a failing client through the user interface 210 (S200).

In the selection made in the operation S200, if the user selects to perform the installing again, the server 200 again performs the installing operation of the driver with respect to the corresponding client.

According to an exemplary embodiment of the present general inventive concept, a server can concurrently perform a remote installation of a driver with respect to at least one client, and can display an installation state to a user and selectively perform the installation again with respect to a client in which the installation failed, thereby saving time and cost in a remote installation and supplying convenience to a user in an installation process.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A driver remote installation method of an image forming apparatus which is connected with at least one of a plurality of clients and a client-server where a client is implemented in a role of a server, the method comprising:
   determining a plurality of groups, by the client-server, from the plurality of clients;
   selecting at least one group in which a driver of one component and a function expansion application of at least one other component of the image forming apparatus are to be installed by the client-server;
   selecting a type of the driver of the one component and the function expansion application of at least one other component to be installed in the plurality of clients included in the selected group;
   installing an install manager agent to connect the client-server and the clients of the selected group, to communicate data including an installation program of the one component and the function expansion application of the at least one other component, and to install the driver of the one component and the function expansion application of the at least one other component in the plurality of clients included in the selected group; and
   installing the selected driver of the one component and the at least one other component in the plurality of clients included in the selected group using the install manager.

2. The method according to claim 1, wherein the installing the driver of the one component and the function expansion application of the a least one other component comprises:
   displaying an installation state of the driver of the one component and the function expansion application of the at least one other component of each client included in the selected group.

3. The method according to claim 1, wherein the determining the group comprises:
   generating the group, adding to the group, loading the group, editing the group, deleting the group, or a combination thereof.

4. The method according to claim 3, further comprising:
   storing information about the determined group.

5. The method of according to claim 1, wherein the determining the group comprises:
   using group information previously stored.

6. The method according to claim 1, wherein the installing the driver of the one component and the function expansion application of the at least one other component comprises:
   copying an installation program of the selected driver of the one component and the function expansion application of the at least one other component in the plurality of clients included in the selected group.

7. The method of according to claim 6, wherein the installing the driver of the one component and the function expansion application of the at least one other component are performed in a background of the plurality of clients.

8. The method according to claim 6, further comprising:
   displaying success or failure, in the client-server, of the installation of the driver of the one component and the function expansion application of the at least one other component of each client included in the selected group.

9. The method according to claim 8, further comprising:
   selecting to install the driver of the one component and the function expansion application of the at least one other component again with respect to a client in which the driver of the one component and the function expansion application of the at least one other component fail to be installed among the selected plurality of clients.

10. The method according to claim 6, further comprising:
    deleting the install manager, the installation program, or both with respect to a client in which the driver of the one component and the function expansion application of the at least one other component are installed among the plurality of clients.

11. The method according to claim 1, any of the plurality of clients may operate as the server.

12. A client-server, where a client is implemented in a role of a server, which is connected with an image forming apparatus and at least one of a plurality of clients, the client-server comprising:
    a communicating unit to communicate with the image forming apparatus and the at least one client;
    a user interface to determine a plurality of groups that includes a plurality of clients and select at least one group in which a driver of one component and a function expansion application of at least one other component of the image forming apparatus is to be installed among the plurality of groups, and a type of the driver of the one component and the function expansion application of the at least one other component to be installed in a plurality of clients included in the selected group;

a display unit; and a control unit to install an install manager agent to connect the client-server and each client of the plurality of clients of the selected group, to communicate data including an installation program of the one component and the function expansion application of the at least one other component, and to install the driver of the one component and the function expansion application of the at least one other component in the plurality of clients included in the selected group, and to control the communicating unit to transmit a command to install the selected driver of the one component and the function expansion application of the at least one other component in the plurality of clients using the install manager corresponding to the selection of the group and to receive installation information of the driver of the one component and the function expansion application of the at least one other component from the plurality of clients included in the selected group, and to control the display unit to display an installation state of the driver of the one component and the function expansion application of the at least one other component of any selected clients corresponding to the received installation information.

13. The server according to claim 12, wherein the determining of the group comprises:

generating the group, adding to the group, loading the group, editing the group, deleting the group, or a combination thereof.

14. The server according to claim 13, further comprising:

a storing unit to store information about the determined group.

15. The server according to claim 14, wherein the control unit determines the group using group information previously stored in the storing unit.

16. The server according to claim 12, wherein the control unit transmits an installation program of the selected driver of the one component and the function expansion application of the at least one other component to the selected clients.

17. The server according to claim 16, wherein the communicating unit receives information indicating success or failure of the installation of the driver of the one component and the function expansion application of the at least one other component from the selected clients, and the display unit displays the success or failure of the installation of the driver of the one component and the function expansion application of the at least one other component of each selected client according to the received information.

18. The server according to claim 17, wherein the user interface selects installation of the driver of the one component and the function expansion application of the at least one other component again with respect to a client in which the driver of the one component and the function expansion application of the at least one other component fail to be installed among the selected clients.

19. The server according to claim 16, wherein the communicating unit transmits a command to delete the install manager, the installation program, or both with respect to a client in which the driver of the one component and the function expansion application of the at least one other component are installed among the selected clients.

20. An image forming system comprising:

an image forming apparatus;

a client-server, where a client is implemented in a role of a server, comprising:

a first communicating unit to communicate with the image forming apparatus and at least one of a plurality of clients, a user interface to determine a plurality of groups that includes the plurality of clients and select at least one client group in which a driver of one component and a function expansion application of at least one other component of the image forming apparatus are to be installed among the plurality of groups, and a type of the driver of the one component and the at least one other component to be installed in the selected group from the plurality of clients, and a first control unit to connect the client-server and each of the selected group from the plurality of clients, to communicate data including an installation program of the one component and the function expansion application of the at least one other component, and to install an install manager agent to install the driver of the one component and the function expansion application of the at least one other component in the selected group from the plurality of clients, and to control the first communicating unit to transmit a command to install the selected driver of the one component and the function expansion application of the at least one other component in the selected group from the plurality of clients using the install manager program according to the selection of the group through the user interface;

wherein a client in the selected group from the plurality of clients comprises:

a second communicating unit to communicate with the image forming apparatus and the client-server, and a second control unit to install the install manager, the selected driver of the one component and the function expansion application of the at least one other component in the client upon receiving the command to use the install manager agent to install the install manager program, the selected driver of the one component and the function expansion application of the at least one other component from the client-server through the second communicating unit.

21. A remote driver installation method, the method comprising:

determining a plurality of groups that includes a plurality of clients by a client-server, where a client is implemented in a role of a server;

selecting at least one of the plurality of groups by the client-server;

selecting, by the client-server, a type of driver of one component and a function expansion application of at least one other component to be installed in the selected group of the plurality of clients;

transmitting, from the client-server, an installation manager program by an installation manager agent to the selected group of the plurality of clients; and installing the driver of the one component and the function expansion application of the at least one other component in the selected group of the plurality of clients using the installation manager program, wherein the selected group of the plurality of clients are selected to have the driver of the one component and the function expansion application of the at least one other component installed, and the driver of the one component and the function expansion application of the at least one other component are installed in all of the selected group of the plurality of clients concurrently.

22. The method of claim 21, wherein any of the plurality of clients may operate as the server.

23. A method of remotely installing a driver of one component and a function expansion application of at least one other component of an image forming apparatus in a plurality of clients by a client-server, where a client is implemented in a role of a server, the method comprising:
   presenting a user interface at the client-server to be used by the user to determine and select a group of clients from the plurality of clients, and to select the driver of the one component and the function expansion application of the at least one other component;
   selecting the group of clients to receive the driver of the one component and the function expansion application of the at least one other component; and
   transmitting an install manager program by an install manager agent from the client-server to the group of clients to install the driver of the one component and the function expansion application of the at least one other component;
   transmitting the driver of the one component and the function expansion application of the at least one other component from the client-server to the group of clients such that the driver of the one component and function expansion application of the at least one other component are concurrently installed in the group of clients.

* * * * *